United States Patent [19]
Ouchi

[11] Patent Number: 5,821,422
[45] Date of Patent: Oct. 13, 1998

[54] ROLLING BEARING UNIT WITH ROTATING SPEED DETECTOR

[75] Inventor: Hideo Ouchi, Fujisawa, Japan

[73] Assignee: NSK Ltd., Tokyo, Japan

[21] Appl. No.: 577,516

[22] Filed: Dec. 22, 1995

[30] Foreign Application Priority Data

Dec. 28, 1994 [JP] Japan .................................. 6-327023

[51] Int. Cl.⁶ .............................. F16C 17/24; G01P 3/44
[52] U.S. Cl. ...................... 73/514.39; 73/494; 324/173; 324/174; 384/448
[58] Field of Search ........................ 73/488, 493, 494, 73/514.39; 324/160, 161, 163, 166, 167, 173, 174, 178, 179, 180; 384/448

[56] References Cited

U.S. PATENT DOCUMENTS

| | | | |
|---|---|---|---|
| 4,907,445 | 3/1990 | Okumura . | |
| 5,296,805 | 3/1994 | Clark et al. . | |
| 5,547,290 | 8/1996 | Ouchi et al. | 324/207.25 |
| 5,583,431 | 12/1996 | Ouchi et al. | 324/174 |
| 5,602,335 | 2/1997 | Ouchi | 324/174 |
| 5,603,575 | 2/1997 | Ouchi | 324/174 |
| 5,622,436 | 4/1997 | Morita et al. | 384/448 |
| 5,670,874 | 9/1997 | Miyazaki et al. | 324/174 |
| 5,677,624 | 10/1997 | Miyazaki et al. | 324/174 |
| 5,678,933 | 10/1997 | Ouchi et al. | 384/448 |

FOREIGN PATENT DOCUMENTS

| | | |
|---|---|---|
| 0 557 931 | 9/1993 | European Pat. Off. . |
| 94-16051 | 8/1994 | Japan . |

*Primary Examiner*—George M. Dombroske
*Assistant Examiner*—Eric S. McCall
*Attorney, Agent, or Firm*—Evenson, McKeown, Edwards & Lenahan, P.L.L.C.

[57] ABSTRACT

A rolling bearing unit has an outer ring member and a rotating speed sensor which is embedded in a synthetic resin block in a cover having a cylindrical portion such that a plurality of protrudents 33 are formed on the outer peripheral face of the synthetic resin block 21 to have its axially inner half portion fitted into the cylindrical portion 19 of the cover 18 in an interference relationship and to have its axially outer half portion fitted into the cylindrical portion 31 of the outer ring member 8 in an interference relationship, thereby preventing the synthetic resin block 21 from being subjected to a large moment load.

6 Claims, 7 Drawing Sheets

ROLLING BEARING UNIT WITH ROTATING SPEED DETECTOR

FIELD OF THE INVENTION

This invention is related to a rolling bearing unit with rotating speed detector to support the vehicle wheels with respect to the suspension freely rotatably and to detect the rotating speed of the wheels.

DESCRIPTION OF THE PRIOR ART

In order that a vehicle wheel is supported with respect to the suspension freely rotatably while an anti-lock brake system (ABS) or a traction control system (TCS) is controlled, various constructions for a rolling bearing unit with rotating speed detector to detect rotating speed of the vehicle wheel are known up to now.

The rotating speed detector which is installed in the rolling bearing unit with rotating speed detector has a tone wheel which rotates with the vehicle wheel and a sensor which outputs a signal in proportion to the rotating speed of the tone wheel.

Various tone wheels and sensors are known up to now. The rotating speed detector of the passive type which uses the tone wheel made of magnetic material and changes the voltage generated in the coil of the sensor according to the rotation of the tone wheel is used widely, because it does not use expensive components.

The passive type rotating speed detector which comprises an annular sensor to make the output of the sensor larger as shown, for example, in HATSUMEI KYOKAI Technical Report Publication No. 94-16051 is known in the prior art.

Figure 6:
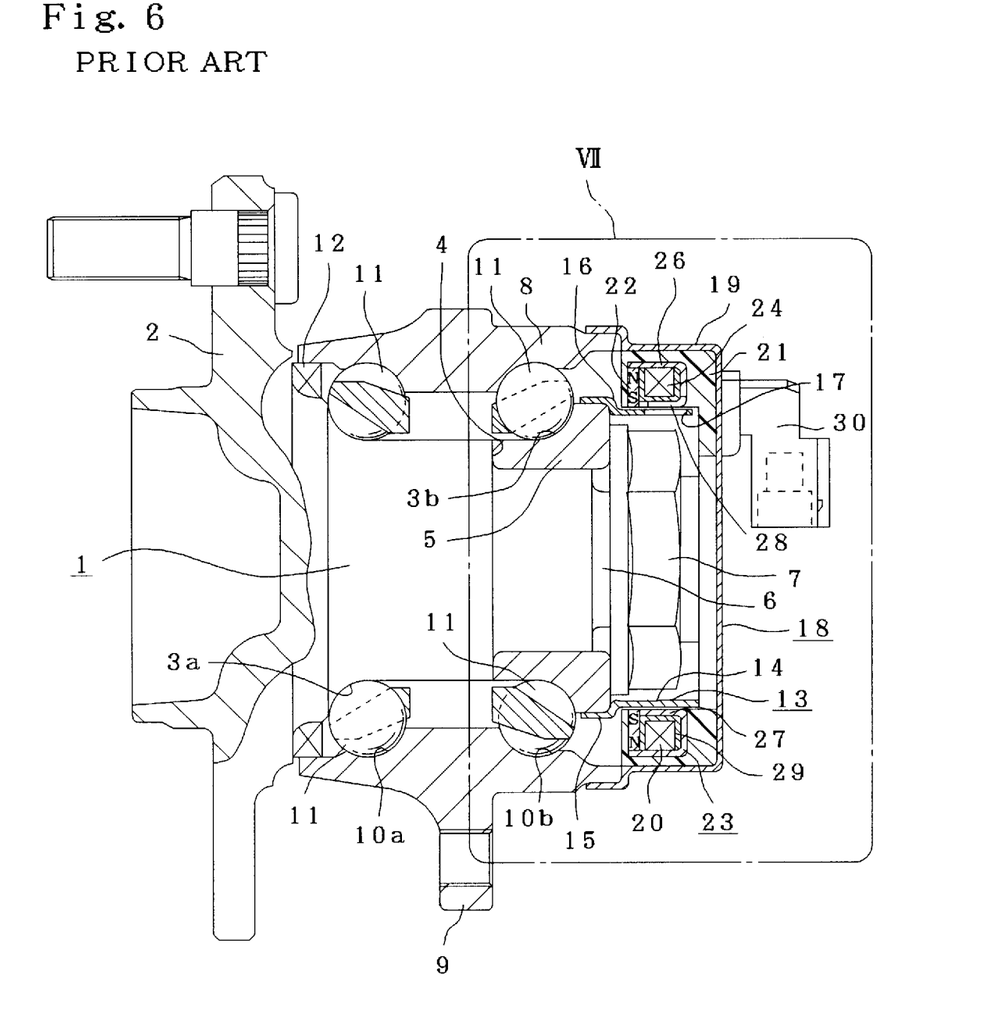
FIG. 6 is a cross sectional view shown an example of the prior art structures.
Figure 7:
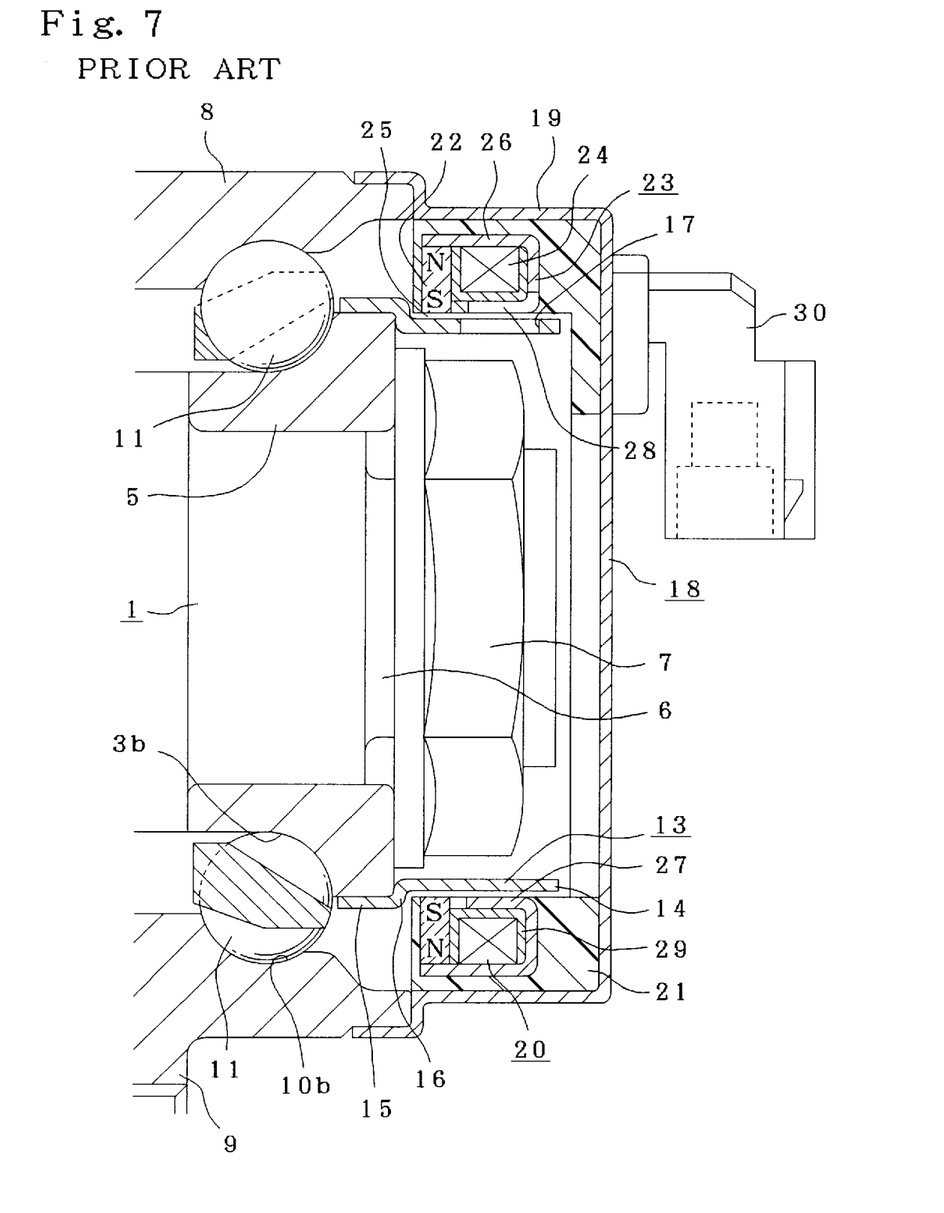
FIG. 7 is an enlarged view of the portion VII in FIG. 6.

FIGS. 6 and 7 show the rolling bearing unit with rotating speed detector as disclosed in this Technical Report Publication.

A hub 1 has an axially outer end portion (the term "axially outer" in the specification means the outer side in a widthwise direction when installed in the vehicle; left in figures) which is formed with a flange 2 for wheel fixture on its outer peripheral face, a mid-portion which is formed with an inner ring raceway 3a and a step portion 4 on its outer peripheral face, and an axially inner end portion (the term "axially inner" means the center side in a widthwise direction when installed in the vehicle; right in figures) which has an inner ring member 5 provided on its outer peripheral face.

The inner ring member 5 is formed with an inner ring raceway 3b and externally fitted to the outer peripheral face of the hub 1 with an axially outer end face thereof abutted against the step portion 4. A male-threaded portion 6 is formed on the axially inner end portion of the hub 1. The inner ring member 5 is fixed at a predetermined location on the outer peripheral face of the hub 1 by means of a nut 7 which is threaded onto the threaded portion 6 and tightened, thus constituting an inner ring assembly together with the hub 1.

There is also the case where, instead of directly forming the inner ring raceway 3a on the outer peripheral face of the hub 1, it is formed as an inner ring member (not shown) separate from the hub 1, and externally fitted to the hub 1 together with the inner ring member 5.

An outer ring member 8 located around the hub 1 has a mid-portion which is provided with an attachment portion 9 on an outer peripheral face thereof, for fixing the outer ring member 8 to a suspension unit.

An inner peripheral face of the outer ring member 8 is formed with respective outer ring raceways 10a, 10b opposite to the inner ring raceways 3a, 3b.

A plurality of rolling bodies 11 are respectively provided between the two inner ring raceways 3a, 3b and the pair of outer ring raceways 10a, 10b, so that the hub 1 is rotatable inside the outer ring member 8.

In the case of a hub unit for heavy vehicles, tapered rollers are used for the rolling bodies instead of the balls shown FIGS. 6 and 7.

A seal ring 12 is fitted between the inner peripheral face at the axially outer end of the outer ring member 8, and the outer peripheral face of the hub 1, to cover the opening at axially outer end of the space in which the plurality of rolling bodies 11 are provided between the inner peripheral face of the outer ring member 8 and the outer peripheral face of the hub 1.

A tone wheel 13 has a base end portion (left end in FIGS. 6 and 7) which is externally fixed to a portion on an axially inner end of the inner ring member 5 which is spaced away from the inner ring raceway 3b.

The tone wheel 13 is made of magnetic metal plate such as steel plate, and is entirely annular or short-cylindrical. The tone wheel 13 comprises a smaller diameter portion 14 and a larger diameter portion 15 that are continuous through a step portion 16 and concentric with each other. This kind of tone wheel 13 is fixed to the inner ring member 5, such that the larger diameter portion 15 is fitted around the outer peripheral face on the axially inner end portion of the inner ring member 5, so that the step portion 16 comes in contact with the axially inner edge of the inner ring member 5. Therefore, the smaller diameter portion 14 is supported so that it is concentric with the inner ring member 5.

There are several through-holes 17 formed around the smaller diameter portion 14 at equal intervals in the circumferential direction to form a first cut out section. Each of these holes 17 are identical and are rectangular shaped to extend in the axial direction (left and right in FIGS. 6 and 7).

An opening portion at the axially inner end portion of the outer ring member 8 is covered with a cover 18 made for example by deep drawing forming a metal sheet such as stainless steel plate, or aluminum alloy plate into the form of a bottomed cylinder.

A synthetic resin block 21 in which is embedded an annular sensor 20 is fixed and retained within the cylindrical portion 19 of the cover 18. This sensor 20 comprises a permanent magnet 22, a stator 23 made of magnetic material such as steel plate, and a coil 24. By embedding the permanent magnet 22, stator 23 and coil 24 in the synthetic resin block 21, the sensor 20 can be made generally annular.

Of these components which make up the sensor 20, the permanent magnet 22 is formed in a generally annular or circular ring shape and magnetized, so that its magnetic orientation is in the radial direction. The inner peripheral face of this permanent magnet 22 is faced, through a small clearance 25, to the outer peripheral face of a base portion of the smaller diameter portion 14 of the tone wheel 13 where the holes 17 are not formed.

The stator 23 is formed so that it is entirely annular and has a radially outer cylindrical section 26 and a radially inner cylindrical section 27 connected to each other through a radial section in a substantially J-shaped cross section. The inner peripheral face on the axially outer end of the radially outer cylindrical section 26 of the stator 23 is very near or comes in contact with the outer peripheral face of the permanent magnet 22. Moreover, the inner peripheral face of the radially inner cylindrical section 27 of the stator 23 is faced to a portion of the tone wheel 13 where the holes 17 are formed.

Furthermore, a plurality of notches 28 with an axial open end are formed in a second cut out section around the radially inner cylindrical section 27 of the stator 23, so that they are located around the cylindrical section 27 circumferentially with the same pitch as the holes 17. The pitch is also referred to as center-angle pitch. Accordingly, the radially inner cylindrical section 27 is formed so that it is comb-toothed.

The coil 24 is formed by winding a conductive wire around a non-magnetic ring 29 so that it is annular shaped, and it is located on the inner peripheral side of the radially outer cylindrical section 26 of the stator 23. The electromotive force (emf) generated in this coil 24 is output from a connector 30 that protrudes from the outside surface of the cover 18.

When using the rolling bearing unit with rotating speed detector constructed as described above, as the tone wheel 13 rotates with the hub 1, the density of the magnetic flux flowing in the stator 23, which is faced to the tone wheel 13, changes, so that the voltage generated in the coil 24 changes at a frequency that is proportional to the rotational speed of the hub 1. The theory behind the change of voltage generated in the coil 24 due to the change in density of the magnetic flux flowing in the stator 23 is the same as that applied for rotating speed detectors that have been widely used in the prior art. The reason that the density of the magnetic flux flowing in the stator 23 changes due to the rotation of the tone wheel 13 is described below.

The through-holes 17 formed around the tone wheel 13 and the notches 28 formed around the stator 23 have the same pitch, so that as the tone wheel 13 rotates, there are moments when they are all faced to each other at the same time. At the moment when these holes 17 and notches 28 are faced to each other, the magnetic column sections located between each pair of adjacent holes 17 and the magnetic tongue-shaped sections located between each pair of adjacent notches 28 are faced to each other through a small clearance 25 between them. When the magnetic column sections and magnetic tongue-shaped sections are faced to each other, the density of the magnetic flux flowing between the tone wheel 13 and the stator 23 is high.

In contrast to this state, when the holes 17 and notches 28 are half out of phase, the density of the magnetic flux flowing between the tone wheel 13 and the stator 23 becomes low. In other words, in this state, the holes 17 formed around the tone wheel 13 are faced to the tongue-shaped sections, while at the same time, the notches 28 formed around the stator 23 are faced to the column sections. When the column sections are faced to the notches 28 and the tongue-shaped sections are faced to the holes 17, there is a comparatively large gap or clearance between the tone wheel 13 and the stator 23 generally along the circumference. In this state, the density of the magnetic flux flowing between the tone wheel 13 and the stator 23 becomes low. As the result, the voltage generated in the aforementioned coil 24 changes proportionally with the rotational speed of the hub 1.

By using a sensor 20 like described above, the output voltage generated in the coil 24 changes with a frequency proportional to the rotational speed of the hub 1. There is an annular, existing space in the opening end portion of the outer ring member 8. It is possible to utilize this annular limited space for installing the sensor 20 to make the output of the sensor 20 sufficiently large enough to reliably detect the rotational speed of the vehicle wheel rotating together with the hub 1.

The permanent magnet 22, the stator 23 and the coil 24, which make up the sensor 20 are all formed in an annular shape that entirely surrounds the tone wheel 13. Since the magnetic flux that comes from the permanent magnet 22 flows all the way around the stator 23, the amount of magnetic flux that flows generally through the stator 23 can be made sufficiently large enough. Thus the change in voltage on the coil 24 that corresponds to the change in density of the magnetic flux passing through the stator 23, can be made large.

The prior art rotating speed detector having the annular sensor 20 can have a larger output than those having the rod shaped sensor which had been known in the art.

There is no problem caused in this rotating speed detector so long as the attachment portion 9 is mounted relatively axially outside (left side in FIGS. 6 and 7).

Figure 1:
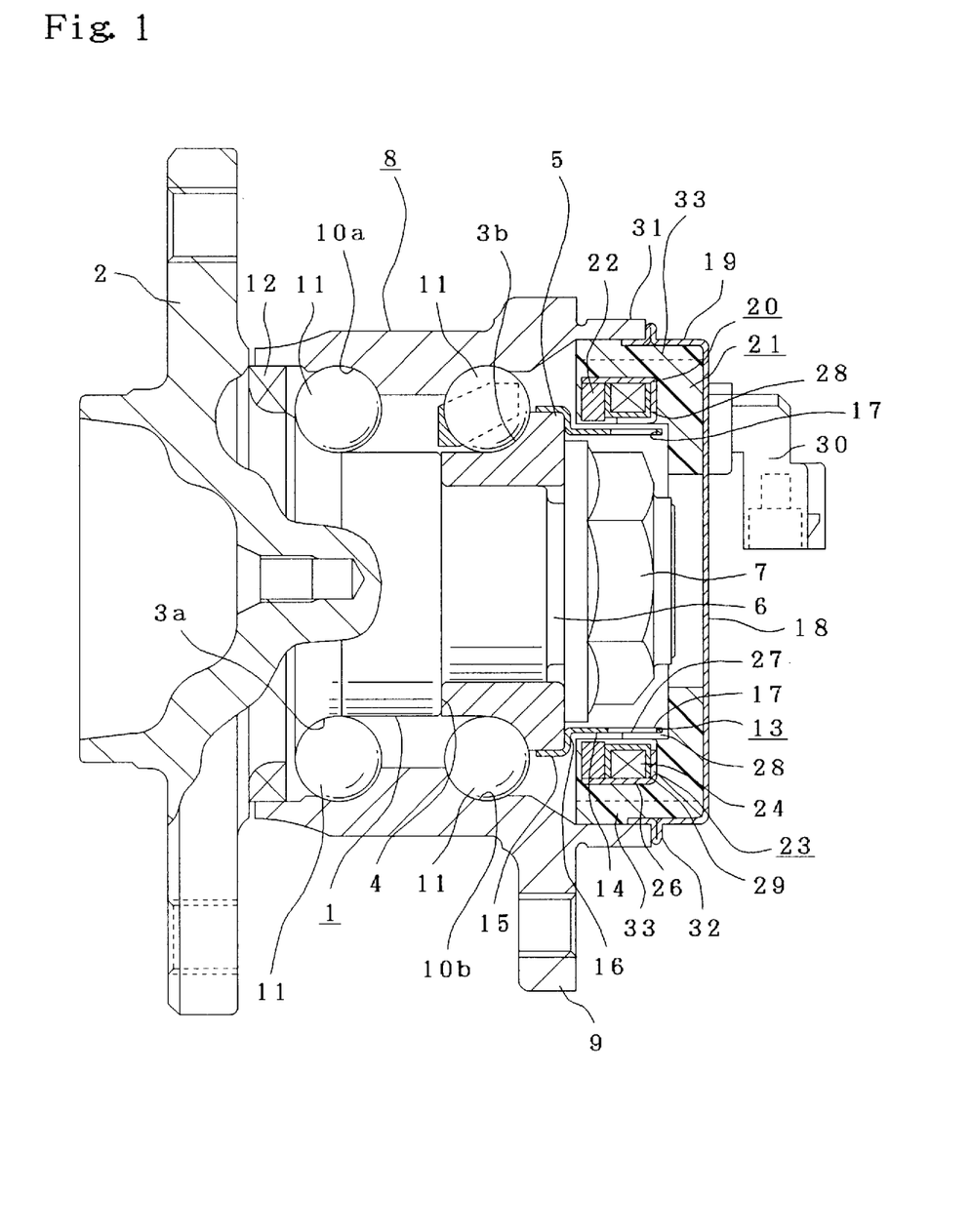
FIG. 1 is a partly cut-away, cross-sectional view of part of a rolling bearing unit, showing an embodiment of the present invention.

However, there are some cases where the attachment portion 9 is mounted to the outer ring member 8 at a portion axially inward of the axially inner row of rolling elements 11 (right row in FIGS. 1, 6 and 7).

In the case of the axially inner position of the attachment portion 9, the axially inner end of the outer ring member 8 extends axially inward comparing with the structure of FIGS. 6 and 7 so as to keep a fitting portion into which the open end portion of the cover 18 is fitted. Therefore, the position of the cover 18, the open end portion of which is fitted into the axially inner end of the outer ring member 8, is moved axially inward.

On the other hand, the axial position (left-right position in FIGS. 1, 6 and 7) of the tone wheel 13 fitted and fixed onto the inner ring 5 is almost the same in the structure of FIGS. 6 and 7 as in the structure of FIG. 1 since the inner ring 5 is arranged based on the position of the axially inner row of the rolling elements 11.

Accordingly, the axially outer end (left end in FIGS. 1, 6 and 7) of the synthetic resin block must overhang from the open end portion of the cover 18 in order that the synthetic resin block 21 with the sensor 20 embedded therein is fitted and fixed into the cover 18, so that the inner peripheral face of the sensor 20 and the outer peripheral face of the tone wheel 13 are opposed to each other.

Consequently, the fitting length between the outer peripheral face of the synthetic resin block and the inner peripheral face of the cylindrical portion 19 of the cover 18 is shortened by the amount of overhanging portion. If the outer peripheral face of the overhanging portion is not securely supported, a large bending moment is applied to a portion of the axially inner end portion (right and portion in FIGS. 1, 6 and 7) which is securely fitted into the cover 18, because of vibrations for example during movements of the vehicle.

In addition, this bending moment would cause flaws such as deformation and cracks in the synthetic resin block 21.

SUMMARY OF THE INVENTION

The rolling bearing unit with rotating speed detector of this invention is provided taking into consideration the situation explained above.

An object of the present invention is to provide a rolling bearing unit with rotating speed detector which comprises a stationary outer ring member having an inner peripheral face formed with an outer ring raceway, a cover fixedly fitted to an end portion of the outer ring member, a rotatable inner ring member having an outer peripheral face opposed to the inner peripheral face and formed with an inner ring raceway, a plurality of rolling elements rotatably provided between the outer ring raceway and the inner ring raceway, an annular tone wheel securely mounted to the end portion of the inner ring members and having a magnetic property in a circumferential direction such that the magnetic property changes with a uniform interval alternately, and a sensor supported inside the cover so as to be opposed to the tone wheel and embedded in the annular synthetic resin block securely fitted into the cover.

In the rolling bearing unit with rotating speed detector in the present invention, the synthetic resin block has one end portion which is projected from the open end of the cover and fitted into the end portion of the outer ring member.

DETAILED DESCRIPTION OF PREFERRED EMBODIMENTS

Like the prior art rolling bearing unit with rotating speed detector described above, the rolling bearing unit with rotating speed detector of this invention comprises a stationary outer ring member having an inner peripheral face formed with an outer ring raceway, a cover fixedly fitted to an end portion of the outer ring member, a rotatable inner ring member having an outer peripheral face opposed to the inner peripheral face and formed with an inner ring raceway, a plurality of rolling elements rotatably provided between the outer ring raceway and the inner ring raceway, an annular tone wheel securely mounted to the end portion of the inner ring members and having a magnetic property in a circumferential direction such that the magnetic property changes with a uniform interval alternately, and a sensor supported inside the cover so as to be opposed to the tone wheel and embedded in the annular synthetic resin block securely fitted into the cover.

In the rolling bearing unit with rotating speed detector in the present invention, the synthetic resin block has one end portion which is projected from the open end of the cover and fitted into the end portion of the outer ring member.

The rolling bearing unit with rotating speed sensor as constructed above in the present invention rotatably supports the vehicle wheel to the suspension apparatus and detects the rotating speed of the vehicle wheel in a similar manner to the prior art rolling bearing unit with rotating speed sensor previously mentioned.

Particularly, in the present invention, the synthetic resin block with the sensor embedded therein has one end portion projected from the cover and fitted into the end portion of the outer ring member, so that the synthetic resin block is prevented from being subjected to a larger moment even with vibrations during movements of the vehicle. Consequently, the synthetic resin block is protected from damages.

Figure 2:
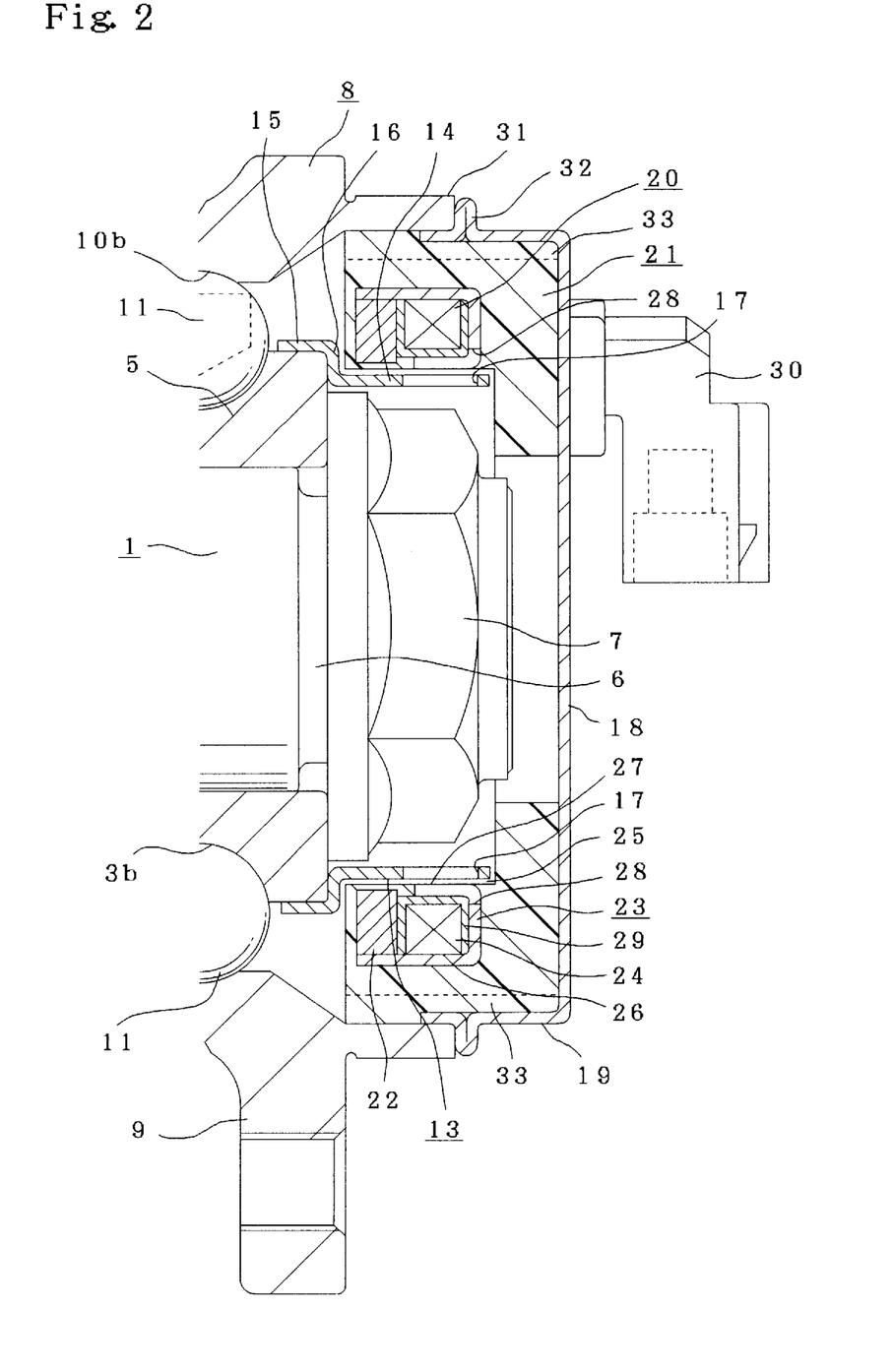
FIG. 2 is a partly cut-away, enlarged view of the right part of FIG. 1.
Figure 3:
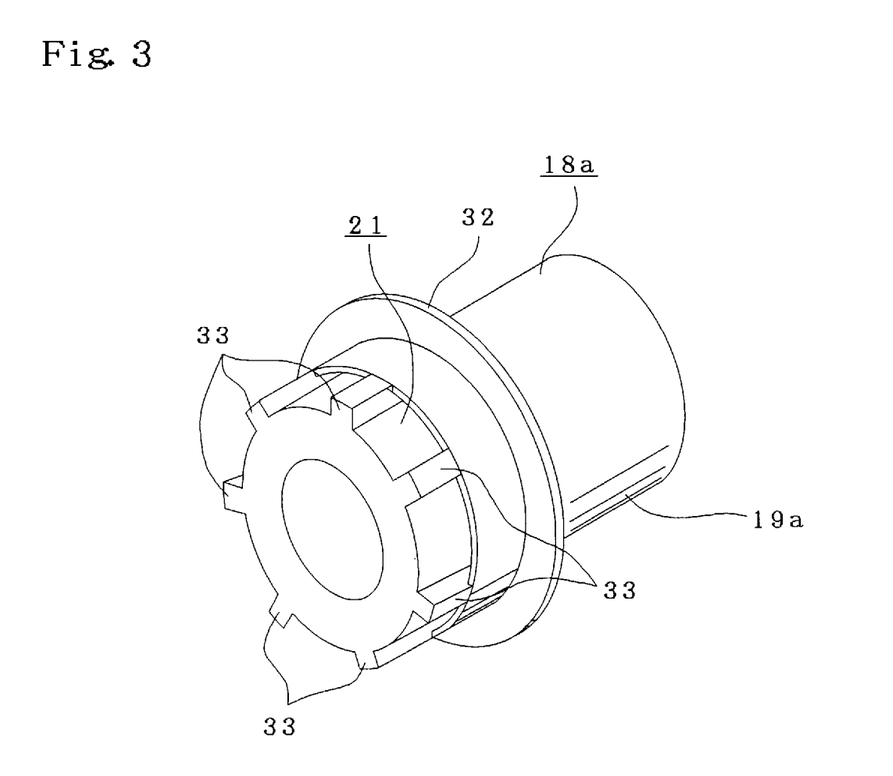
FIG. 3 is a perspective view of a cover in which a synthetic resin block is fitted with a sensor embedded therein, where the axial dimension of the members is larger than the radial dimension.

Now, a first embodiment of the present invention is explained referring to FIGS. 1 to 3, where the synthetic resin block 21 with the sensor 20 embedded therein has a portion which may be projected from the open end of the cover 18. This is true with the cover 18 in the following second embodiment.

The present invention is characterized in a structure by which the part of the synthetic resin block 21 is prevented from being subjected to an excessive moment.

The structure and operation of the other parts are substantially the same as those in the prior art structure. Therefore, like reference numerals are applied to like members, and redundant explanation is omitted or simplified.

The following explanation is mainly directed to the characteristic portion of the present invention.

The attachment portion 9 for mounting the outer ring member 8 to the suspension apparatus is provided on the outer peripheral face of the outer ring member 8 at a portion closer to the axially inner end of the outer ring member 8 (right side in FIGS. 1 and 2), more specifically, axially inward of the axially inner row of the rolling elements 11.

The outer ring member 8 has a cylindrical portion 31 which is projected axially inward from the attachment portion 9 so as to have an axially inner open end portion into which the open end portion of the cover 18 is securely fitted.

The cover 18 has an outwardly flanged portion 32 provided on its outer peripheral face at a portion closer to the open end.

The flanged portion 32 is formed by crimping a portion of metal plate from which the cover 18 is made.

The open end portion of the cover 18 is press-fitted into the cylindrical portion 31, so that the flanged portion 32 is abutted to the end face of the cylindrical portion 31.

Securely fitted into the interior of the cover 18 is a synthetic resin block 21 with the sensor 20 embedded therein, the axially outer half portion of which (left half in FIGS. 1 to 3) is projected from the open end of the cover 18.

There are a plurality of protrudents 33 formed on the outer peripheral face of the synthetic resin block 21 in an axial direction (left-right direction in FIGS. 1 to 3).

The protrudents 33 have an inner half portion (right half portion in FIGS. 1 and 2) which is press-fitted into the cylindrical portion 19 of the cover 18, so that the synthetic resin block 21 is securely fitted into the cover 18.

Accordingly, the inner half portions of the protrudents 33 have a maximum inscribing circle at their tip ends in the free states the diameter of which is a little larger than the inner diameter of the cylindrical portion 19.

The protrudents 33 have an outer half portion (left half portion in FIGS. 1 and 2) which is press-fitted in to the cylindrical portion 31 when the cover 18 is mounted to the outer ring member 8.

Accordingly, the outer half portions of the protrudents 33 have a maximum inscribing circle at their tip ends in the free state, the diameter of which is a little larger than the inner diameter of the cylindrical portion 31.

In the rolling bearing unit with rotating speed sensor in the present embodiment as constructed above, an outer half portion of the synthetic resin block 21 with the sensor 20 embedded therein is projected from the open end of the cylindrical portion 19 of the cover 18. The synthetic resin block 21 has an outer peripheral face on which the protrudents 33 are formed, and the outer half portions of the protrudents 33 are fitted into the cylindrical portion 31 formed at the axially inner end portion of the outer ring member 8. Therefore, any part of the synthetic resin block 21 is prevented from experiencing a larger moment due to vibrations during movements of the vehicle.

Specifically, the synthetic resin block 21 is strongly retained from radially outside by any one of the cylindrical portion 19 of the cover 18 and the cylindrical portion 31 of the outer ring member 8 generally along the axial length from the axially inner end to the axially outer end.

Accordingly, no part of the synthetic resin block 21 is displaced radially although vibrations are applied to the synthetic resin block 21 as the vehicle moves.

Consequently, no part of the synthetic resin block 21 is exposed to a larger moment load, so that the synthetic resin block 21 is not deformed and that no flaw such as cracks are produced in the synthetic resin block 21.

In addition, in the embodiment shown in FIGS. 1 to 3, since the protrudents 33 are formed on the outer peripheral face of the synthetic resin block 21 which is a fitting surface, the rigidity of the synthetic resin block 21 is slightly lowered, accordingly the synthetic resin block 21 is free of damages such as cracking even if the interference between the outer peripheral face of the synthetic resin and the inner peripheral face of the mating member is a little larger due to indispensable errors in processing precision, achieving the fitting support in the mating member.

Figure 4:
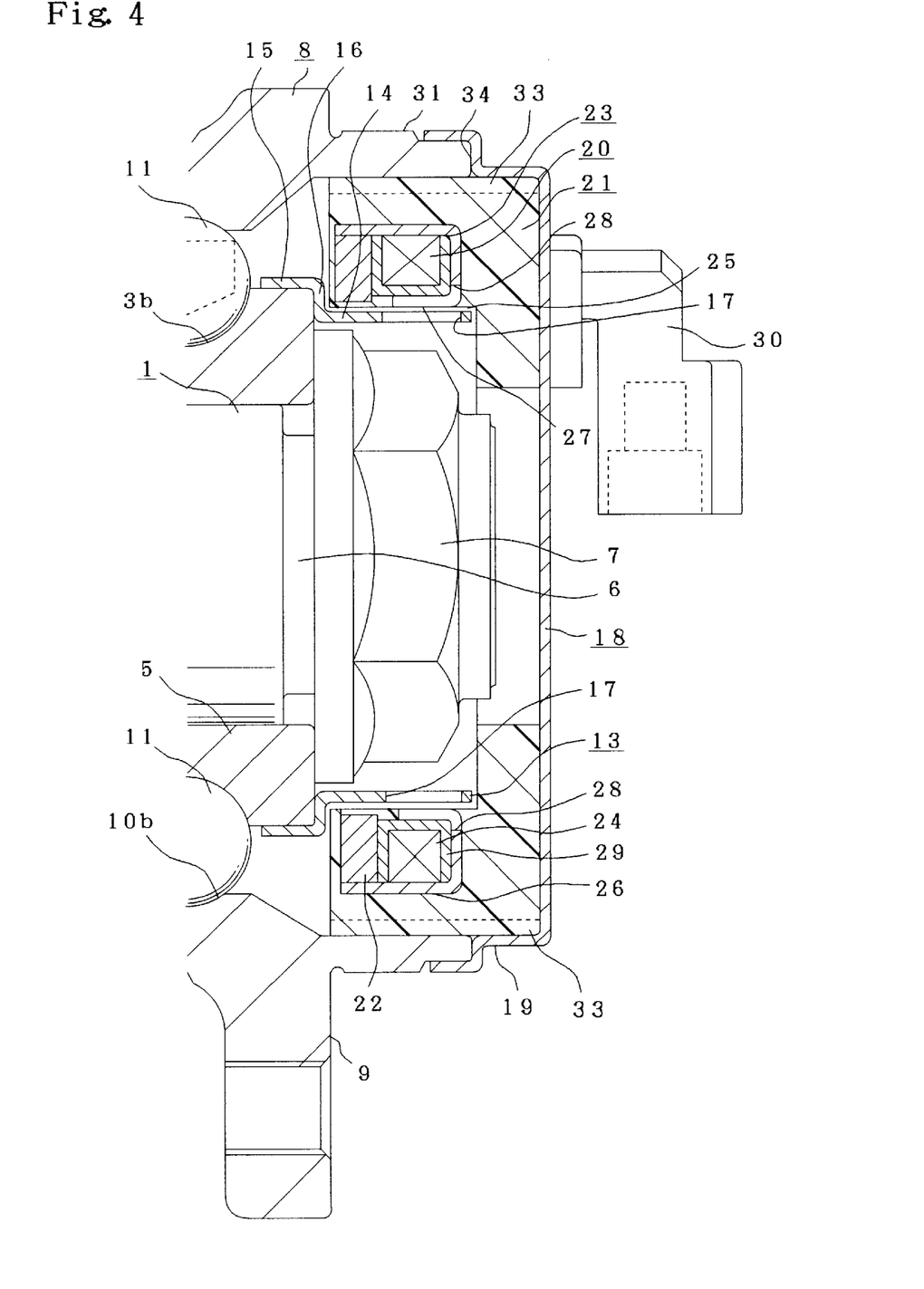
FIG. 4 is a partly cut-away, enlarged view of part of a rolling bearing unit, showing a second embodiment of the present invention similar to FIG. 2.

FIG. 4 shows a second embodiment of the present invention, where a fitting step portion 34 is formed by bending the open end portion (left end portion in FIG. 4) of the cover 18 in a crank shape in cross section in a similar manner with the prior art structure previously explained. The fitting step portion 34 is securely fitted onto the axially inner end open portion (right end portion in FIG. 4) of the cylindrical portion 31 at the axially inner end portion of the outer ring member 8. In addition, the protrudents 33 formed on the outer peripheral face of the synthetic resin block 21 each have a height dimension at the free state which is uniform generally along its axially length.

The protrudents 33 have an inner half portion (right half portion in FIG. 4) fitted into the cylindrical portion 19 of the cover 18, and an outer half portion (left half portion in FIG. 4) fitted into the open end portion of the cylindrical portion 31.

The other structures and operations are substantially the same as those in the first embodiment.

Figure 5:
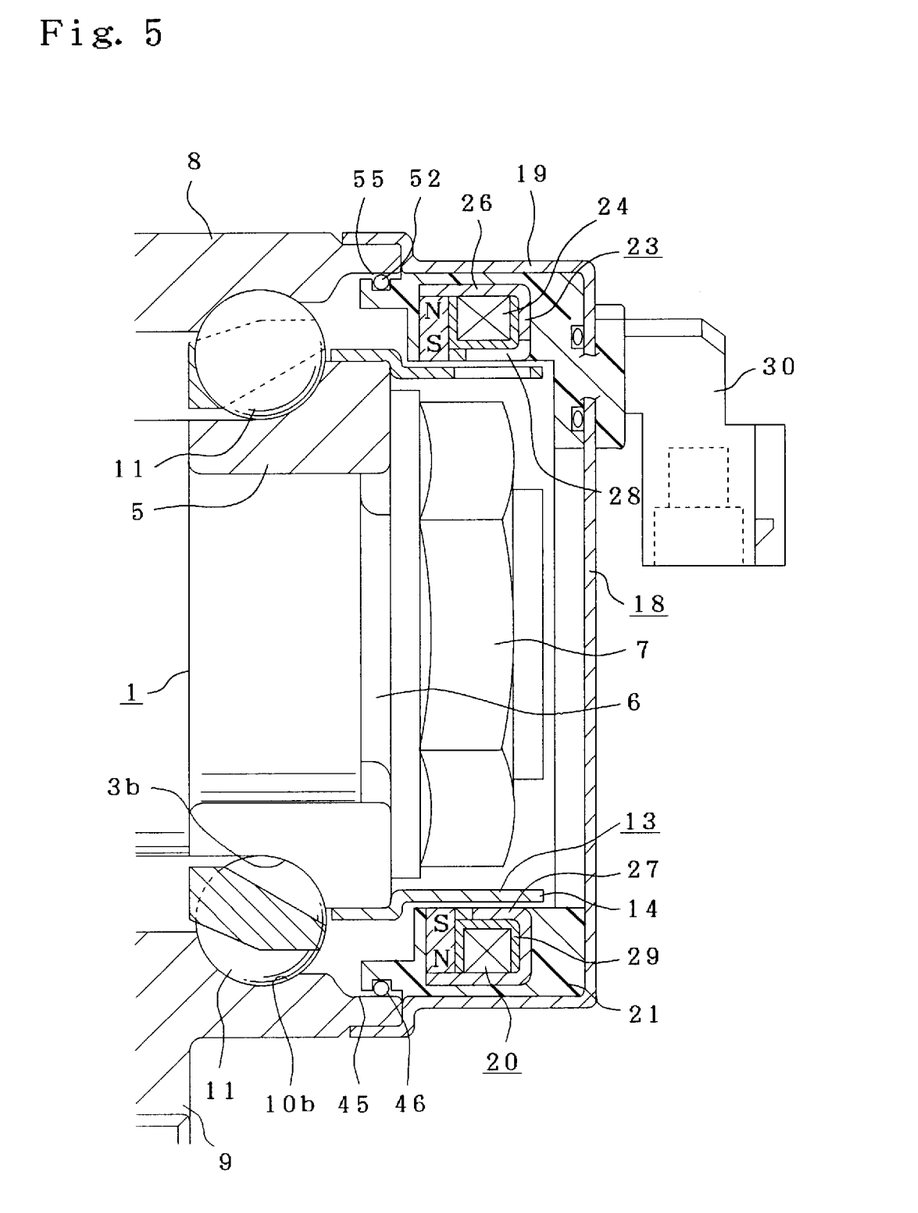
FIG. 5 is a partly cut-away, cross sectional view of another embodiment of the present invention.

FIG. 5 shows another embodiment of the present invention.

The synthetic resin block 21 has an extension 45 at its axially outer end which is projected out of the open end of the cover 18. In this embodiment, there is a clearance of about 0.1 mm to about 0.5 mm between the inner peripheral face of the outer ring member 8 and the outer peripheral face of the extension 45.

The extension 45 of the synthetic resin block 21 is formed with a groove 46 on its outer peripheral face, in which an O-ring 52 is provided. Accordingly, dirty water when penetrating through the fitting portion between the cover 18 and the outer ring member 8, never enters into the bearing portion.

In addition, the O-ring 52 has a performance of supporting the synthetic resin block 21 at its one end.

Instead of the O-ring in the groove 45 in FIG. 5, the outer peripheral face of the extension may be formed in a cylindrical shape with no groove and coated with a sealant, so that the extension is fitted into the outer ring member 8.

The coating of sealant securely prevents dirty water from getting into the bearing portion.

In the embodiment of FIG. 5, a shoulder portion 55 is formed at the axially inner end of the outer ring member 8 to be in a fitting relation with the extension 45 of the synthetic resin block 21.

In addition, the cover 18 has an opening 56 through which the connector 30 is connected to the sensor 20 inside the cover 18. Specifically, the lead wires extending from the sensor 20 are taken out through the opening 56 for connection with the connector 30. Provided around the opening 56 is a gasket 57 to prevent dirty water from entering the sensor portion. Otherwise, the dirty water penetrates through the fitting clearance between the connector 30 and the cover 18 and enters the sensor portion.

Incidentally, in this embodiment, the cover 18 is press-fitted onto the outer peripheral face of the outer ring member 8, but it is also possible for the cover 18 to be press-fitted into the inner peripheral face of the outer ring member 8 in a similar manner as the cover 18 of FIG. 2 is fitted into the outer ring member 8.

It should be noted that the constructions of the tone wheel and sensor for use in the present invention are not limited to those illustrated in this application.

Any tone wheel having the magnetic property provided in a circumferential direction and changing with a uniform interval alternately can be used. For example, the alternate circumferential arrangement of South poles and North poles can be used for the permanent magnet. In addition, any sensor for detecting the rotational speed of the tone wheel can be used, and any type of the prior art sensors can be selected for use corresponding to the property of the tone wheel used.

In the rolling bearing unit with rotating speed detector constructed as mentioned above, the synthetic resin block with the sensor embedded therein can be prevented from being subjected to a large moment load in spite of vibrations caused during the movements of the vehicle even if the mount portion for mounting the outer ring member to the suspension apparatus is placed closer to the axially inner end of the outer ring member.

Consequently, any damages in the synthetic resin block are securely prevented, increasing the durability and reliability of the rolling bearing unit with rotating speed detector constructed as mentioned above.

What is claimed is:

1. A rolling bearing unit with rotating speed detector comprising a stationary outer ring member having an end portion and an inner peripheral face formed with an outer ring raceway, a cover fixedly fitted to the end portion of the outer ring member and having an open end, an annular synthetic resin block securely fitted into the cover and having a plurality of protrudents on an outer peripheral face, a rotatable inner ring member having an end portion and an outer peripheral face opposed to the inner peripheral face and formed with an inner ring raceway, a plurality of rolling elements rotatably provided between the outer ring raceway and the inner ring raceway, an annular tone wheel securely mounted to the end portion of the inner ring member and having a magnetic property in a circumferential direction such that the magnetic property changes with a uniform interval alternately, and a sensor supported inside the cover so as to be opposed to the tone wheel and embedded in the annular synthetic resin block, such that the sensor has at least one portion projected axially outward of the open end of the cover, and the synthetic resin block having one end portion projected from the open end of the cover, so that the synthetic resin block is supported at said protrudents by the cover and the end portion of the outer ring member.

2. The rolling bearing unit with rotating speed detector of claim 1, wherein the one end portion of the synthetic resin block is directly fitted into the end portion of the outer ring member.

3. The rolling bearing unit with rotating speed detector of claim 1, further having an elastic member provided between the one end portion of the synthetic resin block and the end portion of the outer ring member.

4. The rolling bearing unit with rotating speed detector of claim 1, wherein the one end portion of the synthetic resin block projects axially outward of the open end of the cover.

5. The rolling bearing unit with rotating speed detector of claim 1, wherein the one end portion of the synthetic resin block engages the end portion of the outer ring member.

6. The rolling bearing unit with rotating speed detector of claim 1, wherein an outer peripheral surface of the one end portion of the synthetic resin block engages an inner peripheral portion of the end portion of the outer ring member.

* * * * *